United States Patent
Rose et al.

(10) Patent No.: US 8,774,713 B2
(45) Date of Patent: *Jul. 8, 2014

(54) MOBILE WIRELESS COMMUNICATIONS DEVICE ESTABLISHING WIRELESS COMMUNICATION LINKS BASED UPON NEAR FIELD COMMUNICATION AND RELATED METHODS

(75) Inventors: Scott Douglas Rose, Waterloo (CA); Santiago Carbonell Duque, Bogota (CO); Vahid Moosavi, Kitchener (CA); David Ryan Walker, Waterloo (CA); Christopher Lyle Bender, Kitchener (CA)

(73) Assignee: Blackberry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/241,548

(22) Filed: Sep. 23, 2011

(65) Prior Publication Data
US 2012/0214413 A1 Aug. 23, 2012

(30) Foreign Application Priority Data
Sep. 23, 2010 (EP) .................................. 10179039

(51) Int. Cl.
H04B 5/00 (2006.01)
H04B 7/00 (2006.01)
(52) U.S. Cl.
USPC .......................................... 455/41.1; 455/41.2
(58) Field of Classification Search
USPC ................................................. 455/41.1, 41.2
See application file for complete search history.

(56) References Cited

U.S. PATENT DOCUMENTS

| 7,575,177 B2 | 8/2009 | Killian et al. |
| 2007/0073929 A1* | 3/2007 | Takayama et al. ............... 710/51 |
| 2007/0190937 A1 | 8/2007 | Takayama |
| 2007/0202807 A1 | 8/2007 | Kim ............................. 455/41.2 |
| 2009/0111378 A1 | 4/2009 | Sheynman et al. |
| 2009/0132624 A1 | 5/2009 | Haselsteiner et al. |
| 2009/0222659 A1* | 9/2009 | Miyabayashi et al. ........ 713/156 |

(Continued)

FOREIGN PATENT DOCUMENTS

| EP | 1912339 | 4/2008 |
| WO | WO 2004110017 A1 * | 12/2004 |
| WO | 2009/104131 | 8/2009 ............. H04W 8/00 |

OTHER PUBLICATIONS

Palenchar, Joseph "Bluetooth Gets Simple Set-Up, More Security" NewBay Media, Mar. 26, 2007; http://www.twice.com, pp. 1-2.

(Continued)

*Primary Examiner* — Gennadiy Tsvey
(74) *Attorney, Agent, or Firm* — Allen, Dyer, Doppelt, Milbrath & Gilchrist, P.A.

(57) ABSTRACT

A wireless communications system may include first and second mobile wireless communications devices each comprising a respective input device, wireless transceiver, near-field communication (NFC) transceiver, and controller coupled to the input device, wireless transceiver and NFC transceiver. At least one of the controllers may be configured to establish an NFC communications link between the NFC transceivers when the first and second mobile wireless communications devices are in proximity, provide a temporary device identifier (ID) via the NFC communications link, request authorization to establish a wireless link between the wireless transceivers, provide a permanent device ID upon receiving the authorization and based upon the temporary device ID, and establish the wireless link between the wireless transceivers based upon the permanent device ID.

17 Claims, 7 Drawing Sheets

(56) References Cited

U.S. PATENT DOCUMENTS

| | | |
|---|---|---|
| 2010/0093278 A1 | 4/2010 | Abel et al. |
| 2010/0099356 A1* | 4/2010 | Forrest .................. 455/41.2 |
| 2010/0105324 A1 | 4/2010 | Takayama |
| 2012/0069772 A1 | 3/2012 | Byrne et al. |
| 2012/0077432 A1 | 3/2012 | Rose et al. |
| 2012/0077433 A1 | 3/2012 | Walker et al. |

OTHER PUBLICATIONS

Kuo et al, "Low-cost Manufacturing, Usability, and Security: An Analysis of Bluetooth Simple Pairing and Wi-Fi Protected Setup", 2007, pp. 1-15.

Bluetooth: http://en.wikipedia.org/wiki/bluetooth#pairing_mchanisms. Nov. 16, 2010, pp. 1-23.

* cited by examiner

MOBILE WIRELESS COMMUNICATIONS DEVICE ESTABLISHING WIRELESS COMMUNICATION LINKS BASED UPON NEAR FIELD COMMUNICATION AND RELATED METHODS

TECHNICAL FIELD

This application relates to the field of communications, and more particularly, to electronic devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

Figure 1:
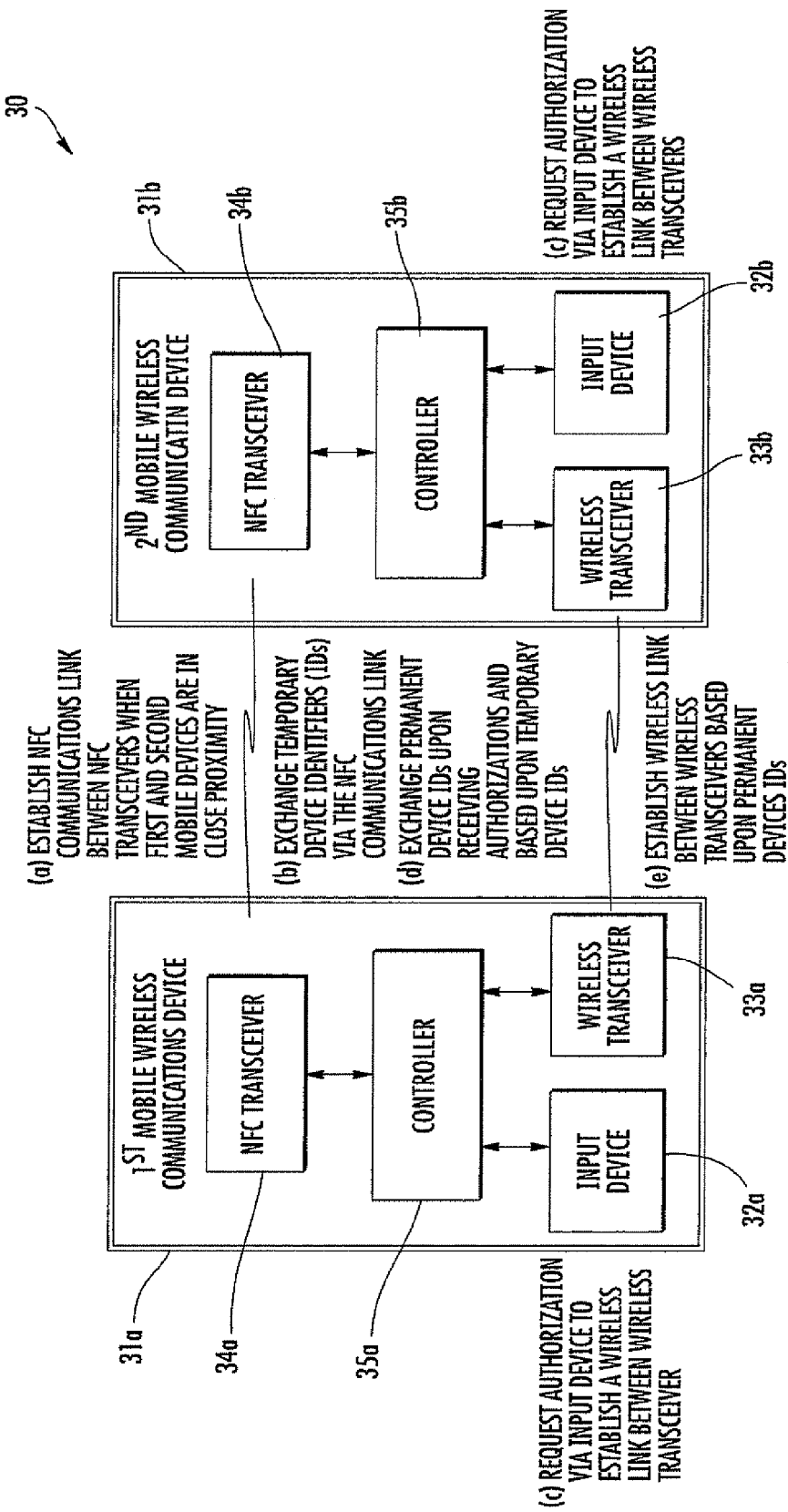
FIG. 1 is a schematic block diagram of a wireless communications system in accordance with one example embodiment.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a wireless communications system is disclosed herein which may include a first mobile wireless communications device comprising a first input device, a first wireless transceiver, a first near-field communication (NFC) transceiver, and a first controller coupled to the first input device, the first wireless transceiver and the first NFC transceiver. A second mobile wireless communications device may include a second input device, a second wireless transceiver, a second NFC transceiver, and a second controller coupled to the second input device, the second wireless transceiver and the second NFC transceiver. At least one of the first controller and the second controller may be configured to establish an NFC communications link between the first NFC transceiver and the second NFC transceiver when the first mobile wireless communications device and second mobile wireless communications device are in proximity, provide a temporary device identifier (ID) via the NFC communications link, request authorization to establish a wireless link between the first wireless transceiver and the second wireless transceiver, provide a permanent device ID upon receiving the authorization and based upon the temporary device ID, and establish the wireless link between the first wireless transceiver and the second wireless transceiver based upon the permanent device ID. As such, the temporary device ID may provide a way to communicate prior to authorizing the wireless link so that the more sensitive permanent device IDs are not compromised by an unauthorized source.

More particularly, at least one of the first mobile wireless communications device or the second mobile wireless communications device may include a display coupled to one of the first controller and the second controller, and the display being configured to display the request for authorization. By way of example, each of the first wireless transceiver and the second wireless transceiver may comprise a Personal Area Network (PAN) transceiver, a Bluetooth transceiver, etc. Also by way of example, the temporary device identifier may comprise a pseudorandom number, and the permanent device ID may comprise a Media Access Control (MAC) address.

Furthermore, at least one of the first input device or the second input device may comprise an input key. At least one of the first input device or the second input device may comprise a touchscreen display. Also, at least one of the first controller and the second controller may be further configured to exchange data via the wireless link and terminate the wireless link upon a conclusion of the data exchange, and purge the permanent device ID upon termination of the wireless link. The first mobile wireless communications device may also comprise a first cellular transceiver coupled with the first controller, and the second mobile wireless communications device may comprise a second cellular transceiver coupled with the second controller. In addition, at least one of the first controller and the second controller may be configured to request authorization to establish the wireless link between the first wireless transceiver and the second wireless transceiver via respective input devices.

A related mobile wireless communications device may include an input device, a wireless transceiver, a near-field communication (NFC) transceiver, and a controller coupled to the input device, the wireless transceiver, and the NFC transceiver. The controller may be configured to establish an NFC communications link between the NFC transceiver and an NFC-enabled device when in proximity thereto, provide a temporary device identifier (ID) via the NFC communications link, request authorization to establish a wireless link between the wireless transceiver and the NFC-enabled device, provide a permanent device ID to the NFC-enabled device upon receiving the authorization and based upon the temporary device ID, and establish the wireless link between the wireless transceiver and the NFC-enabled device based upon the permanent device ID.

A related wireless communications method is for a first mobile wireless communications device comprising a first input device, a first wireless transceiver, a first near-field communication (NFC) transceiver, and a second mobile wireless communications device comprising a second input device, a second wireless transceiver, a second NFC transceiver. The method may include establishing an NFC communications link between the first NFC transceiver and the second NFC transceiver when the first mobile wireless communications device and second mobile wireless communications device are in proximity, providing a temporary device identifier (ID) via the NFC communications link, requesting an authorization to establish a wireless link between the first wireless transceiver and the second wireless transceiver, providing a permanent device ID upon receiving the authorization and based upon the temporary device ID, and establishing the wireless link between the first wireless transceiver and the second wireless transceiver based upon the permanent device ID.

A related non-transitory computer-readable medium may have computer-executable instructions for causing a mobile wireless communication device comprising an input device, a wireless transceiver, and a near-field communication (NFC) transceiver to perform steps including establishing an NFC communications link between the NFC transceiver and an NFC-enabled device when in proximity thereto, and providing a temporary device identifier (ID) via the NFC communications link. The steps may further include requesting authorization to establish a wireless link between the wireless transceiver and the NFC-enabled device, providing a permanent device ID to the NFC-enabled device upon receiving the authorization and based upon the temporary device ID, and establishing the wireless link between the wireless transceiver and the NFC-enabled device based upon the permanent device ID.

Referring initially to FIG. 1, a wireless communication system 30 is first described. The system 30 illustratively includes first and second mobile wireless communications devices 31a, 31b (also referred to a "mobile devices" herein). Each of the first and second mobile devices 31a, 31b illustratively includes a respective input device 32a, 32b (e.g., an input key(s), a touchscreen display, etc.), wireless transceiver 33a, 33b, near-field communication (NFC) transceiver 34a, 34b, and a controller 35a, 35b coupled to the respective input device 32a, 32b, the respective wireless transceiver 33a, 33b, and the respective NFC transceiver 34a, 34b. By way of example, the controllers 35a, 35b may be implemented using a combination of hardware (e.g., microprocessor, etc.) and non-transitory computer readable medium components, as will be discussed further below.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used. The NFC transceivers 34a, 34b may be passive tags or active readers depending upon the given implementation. Example mobile devices 31a, 31b may include portable or personal media players (e.g., MP3 players, video players, etc.), remote controls (e.g., television or stereo remotes, etc.), portable gaming devices, portable or mobile telephones, smartphones, etc.

As discussed above, an NFC connection or link is often used to establish a wireless PAN connection, such as a Bluetooth connection, in which data for establishing the Bluetooth connection is communicated. However, such data typically includes sensitive information, such as a Bluetooth Media Access Control (MAC) address which uniquely identifies a given device. It may be desirable not to communicate such data to unknown or entrusted sources, as this information could be used to track the whereabouts of a mobile device, or potentially for other surreptitious purposes. Yet, typical pairing protocols require the exchange of such information prior to establishing a Bluetooth link, and thus may be communicated without approval when NFC communications are established.

Figure 5:
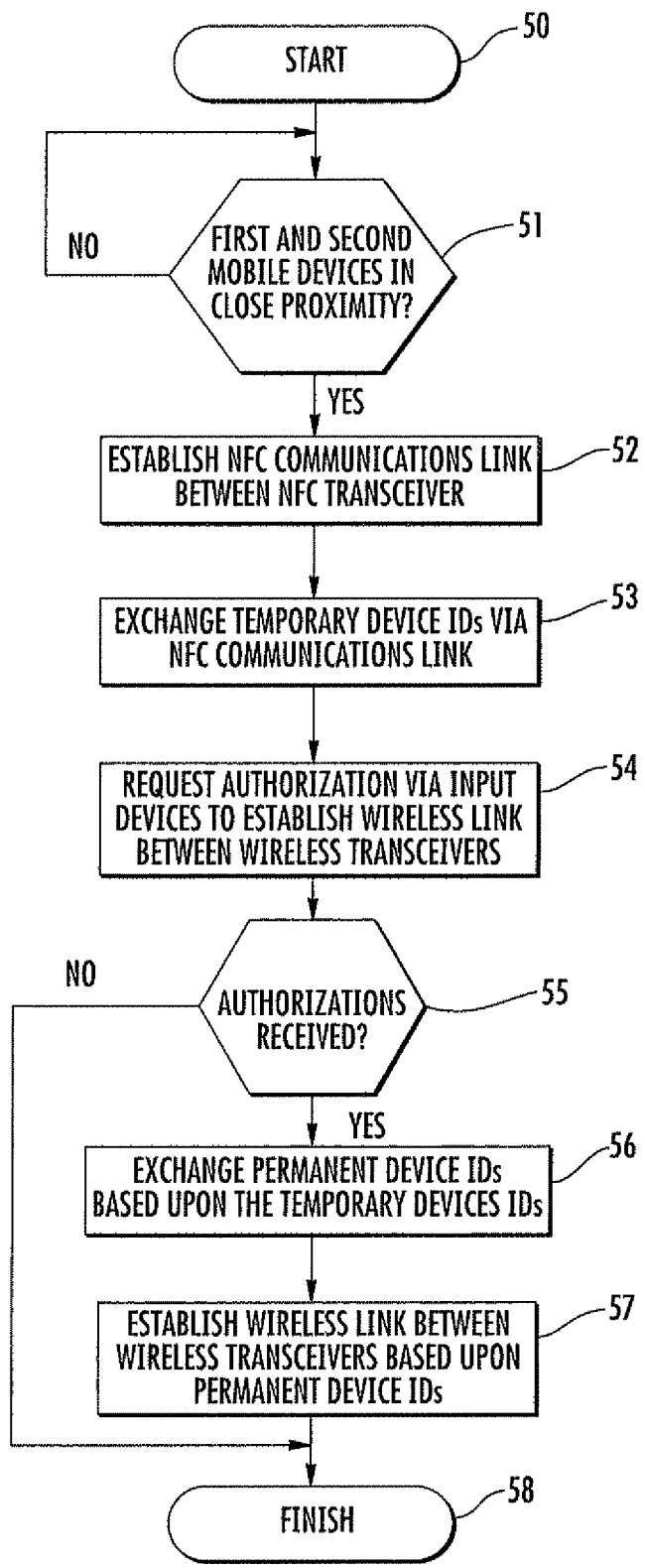
FIGS. 5 and 6 are flow diagrams illustrating method aspects associated with the system and mobile wireless communications devices of FIGS. 1-4.

Referring additionally to FIG. 5, beginning at Block 50, the controllers 35a, 35b may be configured to establish an NFC communications link between the NFC transceivers 34a, 34b when the first and second mobile devices 31a, 31b are in close proximity (e.g., when bumped or swiped), at Blocks 51-52. The controllers 35a, 35b may be further configured to exchange temporary device identifiers (IDs) (e.g., an alphanumeric string) via the NFC communications link, at Block 53, and request authorization via the input devices 32a, 32b to establish a wireless link between the wireless transceivers 33a, 33b, at Block 54. By way of example, the temporary device IDs may be pseudorandom numbers respectively generated by the controllers 35a, 35b whenever a pairing is initiated with another NFC-enabled device (although they may be generated beforehand as well). In this way, the mobile devices 31a, 31b may use the temporary IDs to communicate until authorization is obtained to exchange more sensitive data. Other temporary device IDs besides pseudorandom numbers may also be used, such as an ID from a relatively large "dictionary" or list of IDs that is used only a single time or repeated infrequently so that tracking or other undesirable events are much less likely to occur.

Once the authorization is received, at Block 55, then controllers may exchange permanent device IDs (e.g., Bluetooth MAC addresses, etc.) based upon the temporary device identifiers, at Block 56, and establish the wireless (e.g., Bluetooth) link between the wireless transceivers 33a, 33b based upon the permanent device IDs at Block 57 and then finishes at Block 58. As such, the temporary device IDs provide a way to communicate prior to authorizing the wireless link so that the more sensitive permanent device IDs are not provided to an unauthorized source, and rather the permanent devices IDs are exchanged once it can be determined that the other mobile device is a trusted source.

Figure 3:
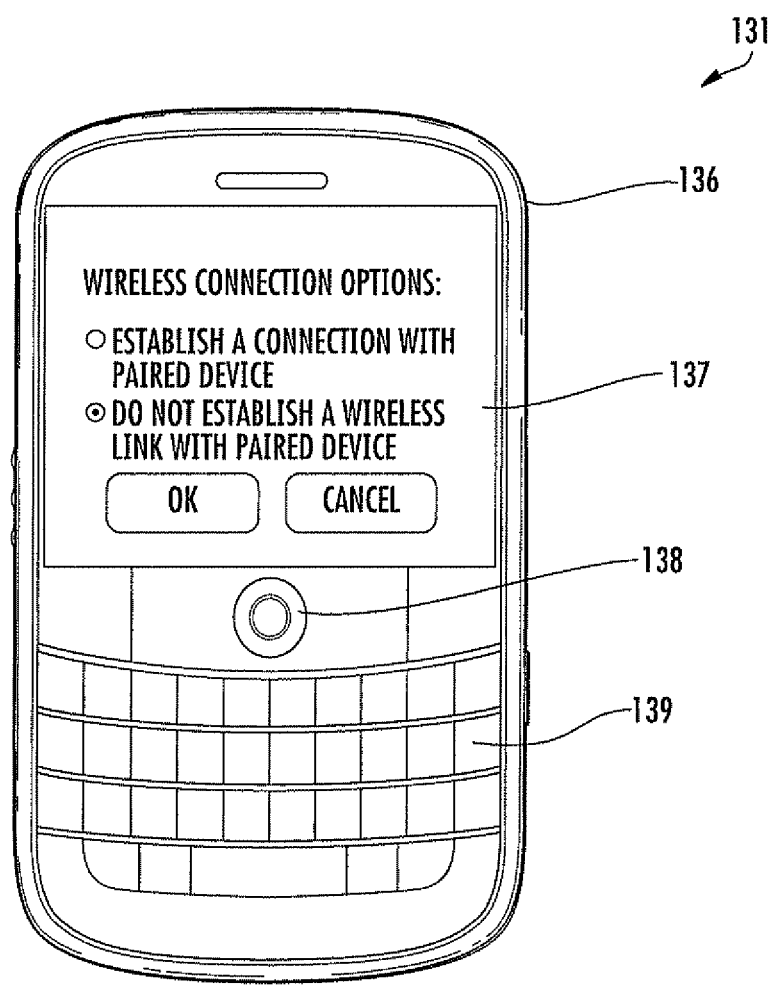
FIGS. 3 and 4 are front views of mobile wireless communications devices in accordance with example embodiments.

An example mobile device 131 is shown in FIG. 3, which illustratively includes a portable housing 136, a display 137 carried by the portable housing 136, as well as a trackball 138 and a keypad 139 as input devices. The mobile device 131 would also include components similar to those discussed above with reference to FIG. 1, which are not shown for ease of illustration. The display 137 is configured to display the request for authorization. In the illustrated example, this takes the form of an on-screen menu providing two options with respect to a requested wireless connection, namely: (1) establish a connection with the paired device (i.e., the NFC-enabled device in proximity with the mobile device 131); or (2) not to establish a wireless link with the paired device (i.e., because it is unknown, not trustworthy, etc.). The trackball 138 (or keypad 139) may be used to select the desired option from the menu.

Figure 4:
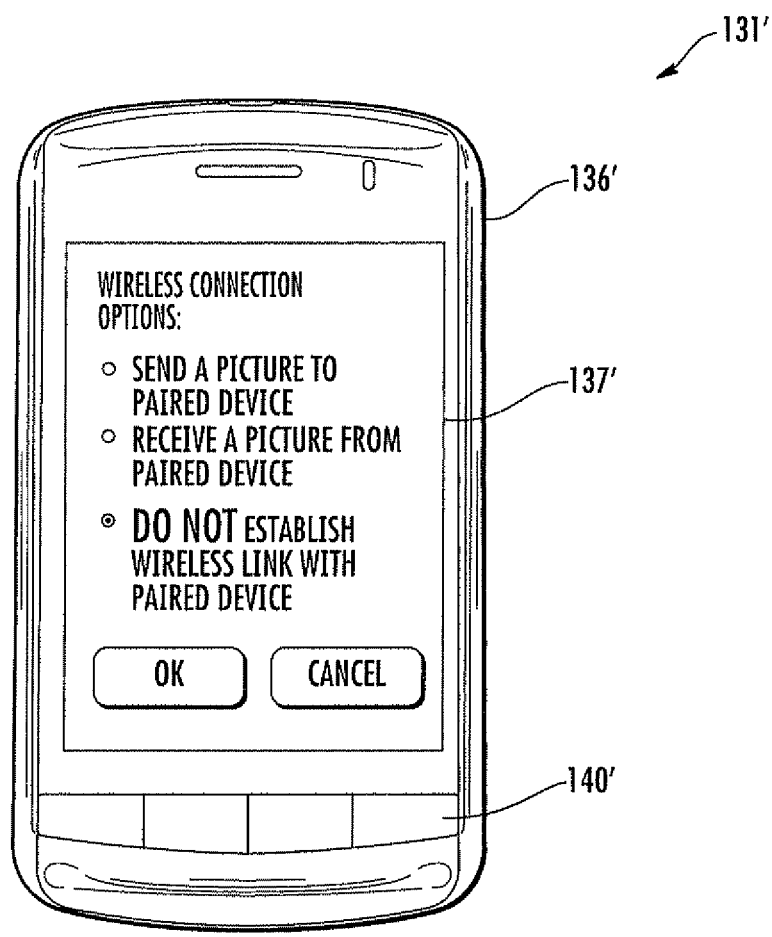

In some implementations, a more extensive list of authorization menu options may be provided, such as in the example mobile device 131' of FIG. 4. Here, the mobile device 131' illustratively includes a housing 136' and touch-screen display 137' and function buttons 140'. In this example, menu options are provided for sending or receiving a picture from an NFC-enabled device, as well as the option not to establish a wireless (e.g., Bluetooth) link with the other NFC-enabled device.

Figure 6:
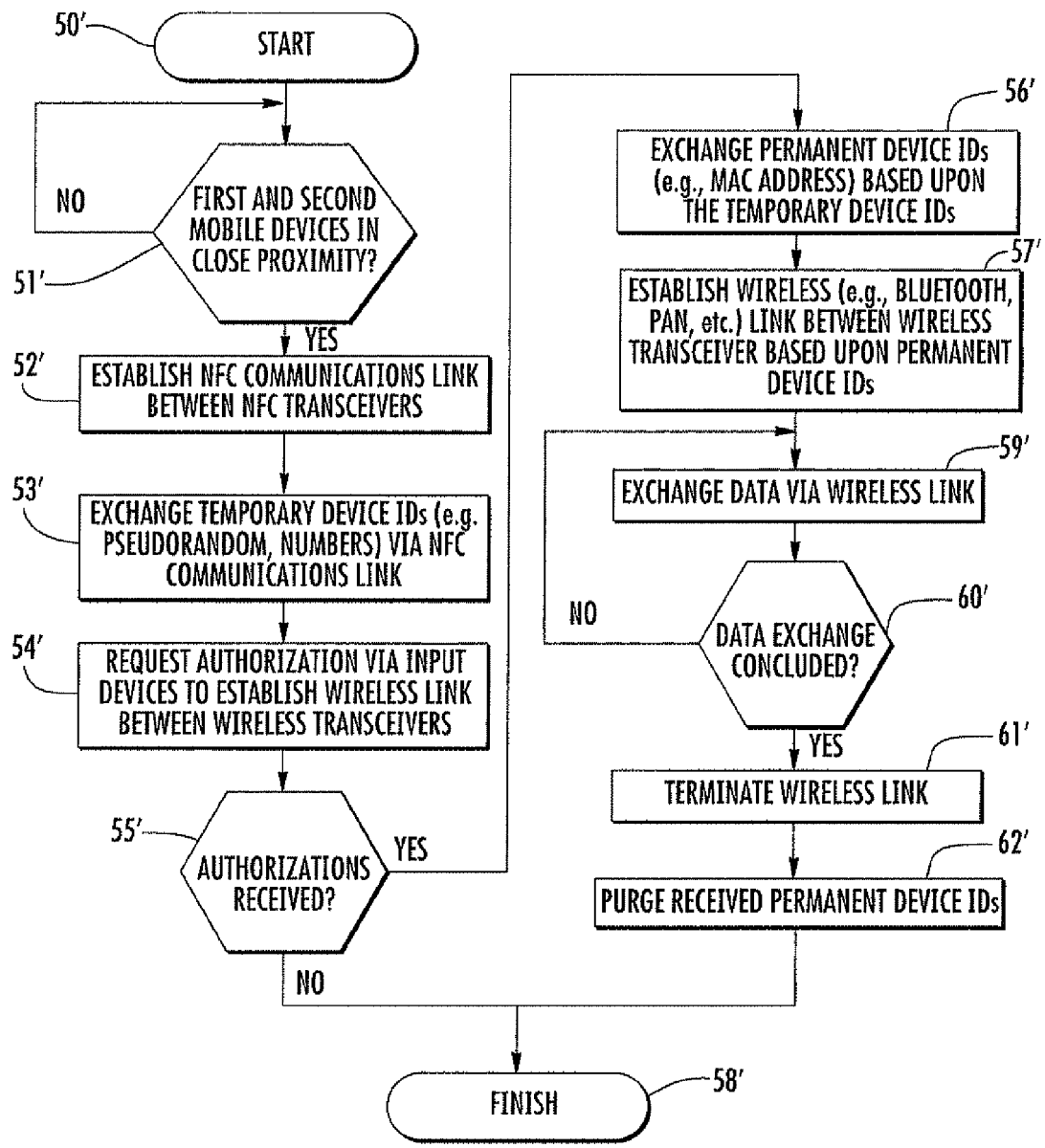

If the option to establish the wireless link is selected (i.e., authorization is provided), the mobile device controllers 35a, 35b are further configured upon establishing the wireless link to exchange data (e.g., a picture file(s), etc.) via the wireless link, and terminate the wireless link upon a conclusion thereof. The controllers 35a, 35b may also be configured to purge the permanent device IDs received from one another upon termination of the wireless link, if desired, at Blocks 59'-62' (see FIG. 6). Blocks 50' through 58' are the same as Blocks 50 through 58 of FIG. 5 except with prime notation.

Figure 2:
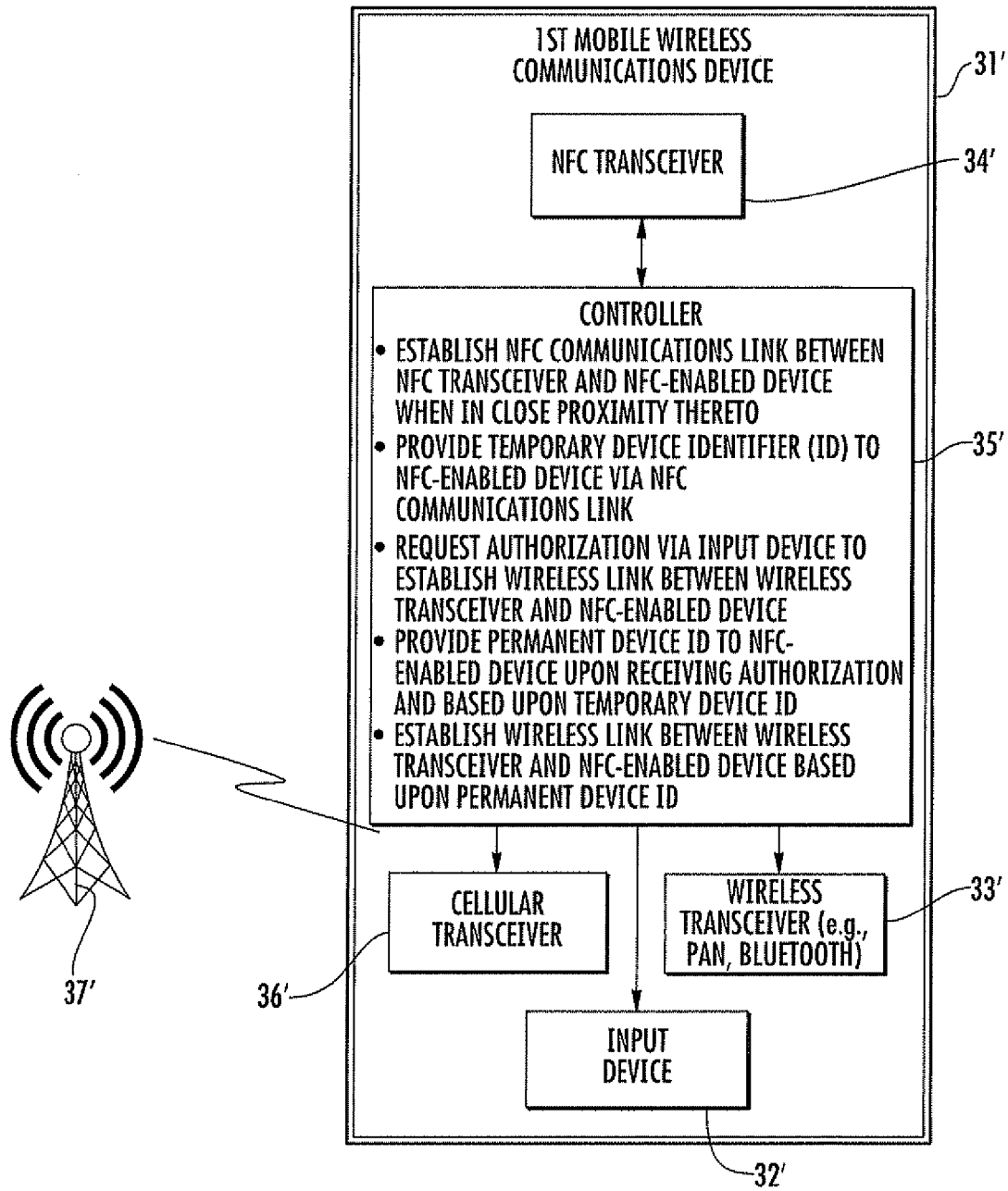
FIG. 2 is a schematic block diagram of a mobile wireless communications device in accordance with an example embodiment.

In some embodiments, both devices need not be performing the above-described authorization operations; rather only one of the two devices may perform the authorization operations. Referring to FIG. 2, the mobile device 31' may provide a temporary device ID to another NFC-enabled device when in close proximity therewith, but the NFC-enabled device may or may not provide a temporary device ID (i.e., it may convey a permanent ID) or request authorization before establishing the wireless link. Yet, the controller 35' does request the authorization, and only establishes the wireless link upon receiving the authorization to do so. This advantageously helps secure against a wireless connection being established with the wireless transceiver 33' without prior authorization, to thereby help avoid tracking or other undesirable actions. In the example of FIG. 2, the mobile device 31' further illustratively includes a cellular transceiver 36' for communicating via a cellular network, which is illustratively represented as a cell tower 37'.

A related non-transitory computer-readable medium may have computer-executable instructions for causing a mobile device 31' to perform steps comprising establishing an NFC communications link between the NFC transceiver 34' and an NFC-enabled device when in close proximity thereto, and providing a temporary device ID to the NFC-enabled device via the NFC communications link. Further steps may include requesting authorization via the input device 32' to establish a wireless link between the wireless transceiver 33' and the NFC-enabled device, providing a permanent device ID to the NFC-enabled device upon receiving the authorization and based upon the temporary device ID, and establishing the wireless link between the wireless transceiver and the NFC-enabled device based upon the permanent device ID, as discussed above.

The foregoing will be further understood with reference to an example implementation thereof. Referring again to FIG. 1, when the mobile devices 31a, 31b are tapped together or otherwise moved in close proximity to one another, the NFC transceivers exchange pseudorandom numbers as temporary device IDs. A menu is provided (such as on the display 137 or 137' in FIGS. 3 and 4, respectively), at which point an appropriate send or receive (or both) option is chosen, or the wireless connection is cancelled if it is not desired to establish the wireless link between the mobile devices 31a, 31b. In the event that a send or receive (or both) option is chosen, then Bluetooth MAC addresses are exchanged as the permanent IDs, and a Bluetooth peer-to-peer connection is established using the pseudorandom numbers as discoverable names. These discoverable names may then be changed back to default names, if desired, in some embodiments. It should be noted that in some implementations, the authorization may be performed without requiring a user to select the various options (i.e. the authorization may be received automatically). In accordance with one example, a challenge-response exchange between the two devices may be used.

Considered in other terms, both mobile devices 31a, 31b switch to Bluetooth discoverable modes using the pseudorandom numbers they exchanged via the NFC link as their temporary Bluetooth name. The mobile devices 31a, 31b search for one another, pair, and then switch back to a non-discoverable mode. In accordance with one example, an exchanged pseudorandom number(s) may be used to initiate a Diffie-Hellman key exchange. Another example is that the random number may encode a certificate/private key used for other cryptographic protocols.

When the initial data exchange is complete (e.g., sending a selected picture, etc.), various options are available. An example option is to prompt whether the Bluetooth connection should remain open or should be closed (such as through an on-screen menu, for example). Another example option is to automatically terminate the connection when the given data transfer operation is complete. Still another example option is to "forget" or purge the Bluetooth MAC addresses that were exchanged, as discussed above, and this may even be a default operation that is automatic and set at the time of manufacturing, if desired.

Various embodiments of the above-described systems, methods, and computer-readable media may provide numerous technical advantages. One of these advantages in some embodiments is that a special or designated button or menu option is not required to activate NFC operation. Simply tapping or otherwise moving the devices together initiates the process. Moreover, by exchanging temporary device IDs (e.g., pseudorandom numbers), neither mobile device has revealed any private information. Thus, in some embodiments, if a given mobile device is maliciously scanned via NFC, all that is transmitted is a pseudorandom number. Since it is a pseudorandomly generated number, this would not facilitate tracking of the mobile device. Additionally, the temporary device ID (e.g., pseudorandom number) exchange may advantageously cause the above-described authorization menu to be displayed so that there is a warning that scanning via NFC has occurred, and thereby provide an alert to a potential attack attempt. Further, the pseudorandom number is dynamic, and therefore not a constant like a permanent Bluetooth MAC address that may potentially be used to track a mobile device over time.

Example components of a mobile wireless communications device 1000 that may be used in accordance with the above-described embodiments are further described below with reference to FIG. 7. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 7:
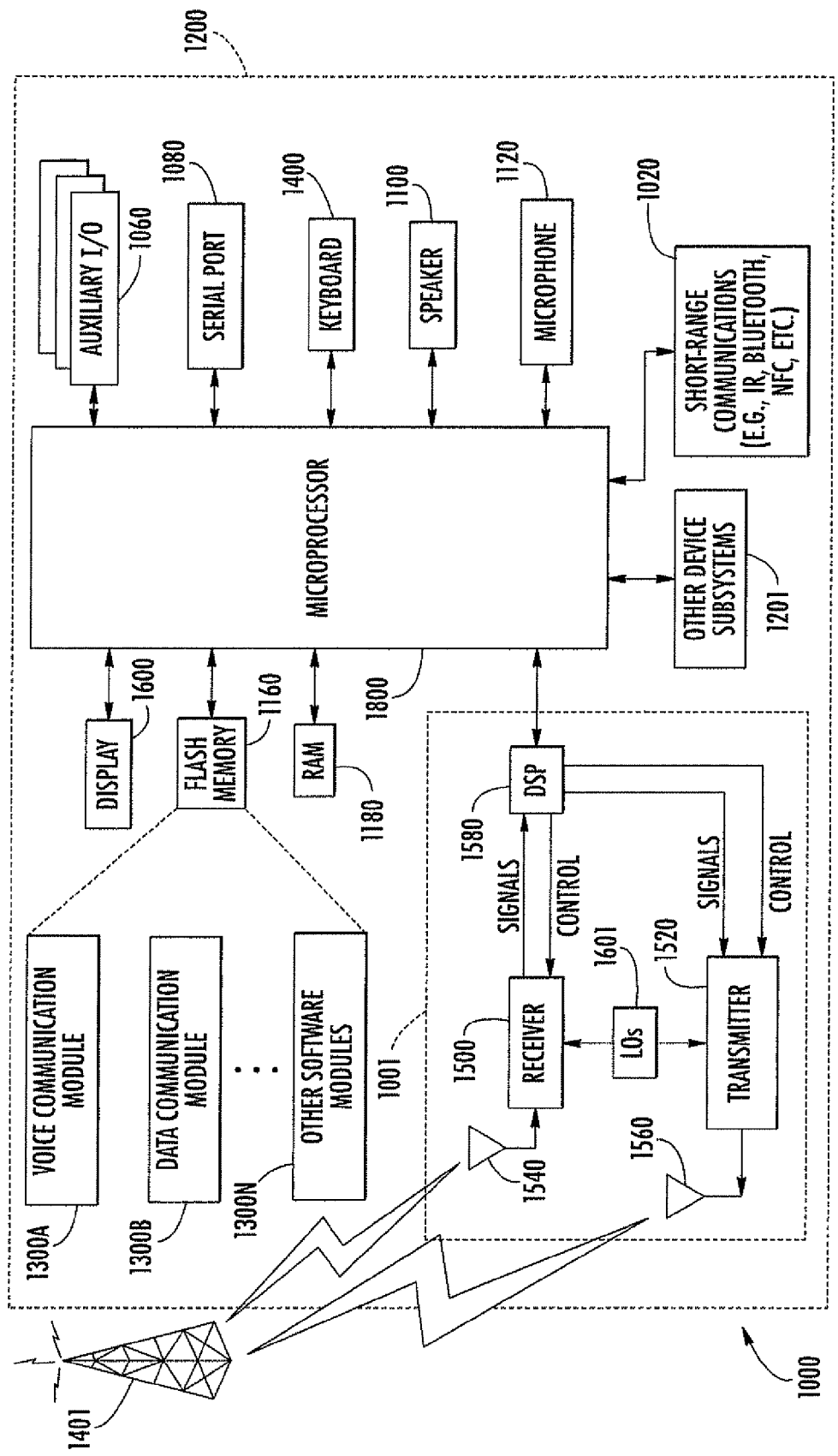
FIG. 7 is a schematic block diagram illustrating example mobile wireless device components that may be used with the mobile wireless communications devices of FIGS. 1-4.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (Ws) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, NFC or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications system comprising:
   a first mobile wireless communications device comprising a first input device, a first wireless transceiver, a first near-field communication (NFC) transceiver, and a first controller coupled to said first input device, said first wireless transceiver and said first NFC transceiver; and
   a second mobile wireless communications device comprising a second input device, a second wireless transceiver, a second NFC transceiver, and a second controller coupled to said second input device, said second wireless transceiver and said second NFC transceiver;

wherein said first controller and said second controller are configured to establish an NFC communications link between said first NFC transceiver and said second NFC transceiver when said first mobile wireless communications device and second mobile wireless communications device are in proximity, and each controller generates a pseudorandom number as a temporary device identifier (ID) corresponding to a temporary Bluetooth name for each device and exchanges the respective pseudorandom numbers as the temporary device ID's via the NFC communications link, and in response to exchanging the temporary device ID's, displaying an authorization menu on a display and requesting authorization using the display to establish a wireless link between said first wireless transceiver and said second wireless transceiver, said first and second wireless transceivers are configured to exchange permanent device address ID's identifying an address of respective first and second mobile wireless communications devices upon receiving the authorization, and establish the wireless link between said first wireless transceiver and said second wireless transceiver based upon the permanent device address ID's of the first and second wireless transceivers.

2. The wireless communications system of claim 1 wherein each of said first wireless transceiver and said second wireless transceiver comprises a Personal Area Network (PAN) transceiver.

3. The wireless communications system of claim 1 wherein each of said first wireless transceiver and said second wireless transceiver comprises a Bluetooth transceiver.

4. The wireless communications system of claim 1 wherein the permanent device address ID comprises a Media Access Control (MAC) address.

5. The wireless communications system of claim 1 wherein at least one of said first input device or said second input device comprises an input key.

6. The wireless communications system of claim 1 wherein at least one of said first input device or said second input device comprises a touchscreen display.

7. The wireless communications system of claim 1 wherein at least one of said first controller and said second controller is further configured to:

exchange data via the wireless link and terminate the wireless link upon a conclusion of the data exchange; and purge the permanent device address ID upon termination of the wireless link.

8. The wireless communications system of claim 1 wherein at least one of said first controller and said second controller is configured to request authorization to establish the wireless link between said first wireless transceiver and said second wireless transceiver via respective input devices.

9. A wireless communications method for a first mobile wireless communications device comprising a first input device, a first wireless transceiver, a first near-field communication (NFC) transceiver, and a first controller coupled to the first input device, and a second mobile wireless communications device comprising a second input device, a second wireless transceiver, a second NFC transceiver and a second controller coupled to the second input device, the method comprising:

establishing an NFC communications link between the first NFC transceiver and the second NFC transceiver when the first mobile wireless communications device and second mobile wireless communications device are in proximity and each controller generating a pseudorandom number as a temporary device identifier (ID) corresponding to a temporary Bluetooth name and exchanging the respective pseudorandom numbers as the temporary device ID's via the NFC communications link;

and in response to exchanging the temporary device ID's, displaying an authorization menu on a display and requesting an authorization using the display to establish a wireless link between the first wireless transceiver and the second wireless transceiver;

exchanging permanent device address ID's for respective first and second mobile wireless communications devices upon receiving the authorization and based upon the temporary device ID; and establishing the wireless link between the first wireless transceiver and the second wireless transceiver based upon the permanent device address ID's of each of the mobile wireless communications devices.

10. The method of claim 9 wherein each of the first wireless transceiver and the second wireless transceiver comprises a Bluetooth transceiver.

11. The method of claim 9 wherein the permanent device address ID comprises a Media Access Control (MAC) address.

12. The wireless communications system of claim 9 wherein at least one of said first controller and said second controller is configured to request authorization to establish the wireless link between said first wireless transceiver and said second wireless transceiver via respective input devices.

13. The method of claim 9 wherein at least one of the first input device or the second input device comprises an input key.

14. The method of claim 9 wherein at least one of the first input device or the second input device comprises a touchscreen display.

15. The method of claim 9 further comprising:

exchanging data via the wireless link and terminating the wireless link upon a conclusion of the data exchange; and purging the permanent device address ID upon termination of the wireless link.

16. The method of claim 9 wherein the first mobile wireless communications device comprises a first cellular transceiver; and wherein the second mobile wireless communications device comprises a second cellular transceiver.

17. The method of claim 9 wherein each of the first wireless transceiver and the second wireless transceiver comprises a Personal Area Network (PAN) transceiver.

* * * * *